United States Patent [19]
Muller et al.

[11] Patent Number: 5,514,758
[45] Date of Patent: May 7, 1996

[54] PROCESS FOR MAKING LATEX FOR HIGH PERFORMANCE MASKING TAPE

[75] Inventors: Pascale F. J. Muller, Vanves, France; Fabienne Rouviere, Choisel, both of France

[73] Assignee: The Goodyear Tire & Rubber Company, Akron, Ohio

[21] Appl. No.: 315,475

[22] Filed: Sep. 30, 1994

[51] Int. Cl.$^6$ .............................. C08F 2/16; C08F 212/08
[52] U.S. Cl. ................................. 526/73; 526/78; 526/80; 526/87; 526/329.2; 526/347
[58] Field of Search ................................. 526/78, 73, 80, 526/87, 329.2, 347, 73, 78, 80, 87

[56] References Cited

U.S. PATENT DOCUMENTS 4,384,096  5/1983  Sonnabend ............................... 526/313

*Primary Examiner*—Thomas R. Weber
*Attorney, Agent, or Firm*—Alvin T. Rockhill

[57] ABSTRACT

This invention discloses a process for preparing a latex which is particularly beneficial for utilization in manufacturing high performance masking tape, which includes the sequential steps of (1) terpolymerizing a vinyl aromatic monomer, an alkyl acrylate monomer, and an alkyl propenoic acid monomer in an aqueous polymerization medium by free radical polymerization to produce a seed polymer latex; (2) neutralizing the seed polymer latex to a pH of about 6 to about 9 by the addition of an alkali; (3) adding additional vinyl aromatic monomer and alkyl acrylate monomer to the neutralized seed polymer latex; and (4) allowing the additional vinyl aromatic monomer and alkyl acrylate monomer to polymerize in a second polymerization step to a solids content of about 30% to about 50% to produce the latex which is particularly beneficial for utilization in manufacturing high performance masking tape.

21 Claims, No Drawings

PROCESS FOR MAKING LATEX FOR HIGH PERFORMANCE MASKING TAPE

BACKGROUND OF THE INVENTION

Masking tape is generally made utilizing paper which is impregnated with a latex. The paper is impregnated with latex to improve its physical properties and chemical resistance. This procedure incorporates a binder polymer from the latex into the paper to increase the tensile strength, tear resistance, delamination resistance, and water resistance of the paper. The impregnation procedure is normally done by passing the paper through a bath containing the latex for residence time which is sufficient for the paper to absorb the latex.

The paper having the binder polymer incorporated therein is then further processed into masking tape. In the procedure used one side of the paper is coated with a release coat. The other side of the paper is coated with an adhesive layer. Optionally the side of the paper which is coated with the adhesive is first coated with a primer coat and subsequently coated with an adhesive layer. The masking tape can then be rolled and packaged for later use.

Acrylic latices, carboxylated styrene-butadiene rubber latices, and acrylonitrile-butadiene latices are currently used industrially in the impregnation of paper which is employed in manufacturing masking tape. However, improved latices are desired for this purpose. It is highly desirable for the latex to be capable of being impregnated into the paper without encountering foaming or coagulum formation during normal processing. For instance, the shearing forces encountered during the impregnation procedures often cause coagulum formation with the coagulum building up on equipment rollers. It would be optimal to eliminate this problem while maintaining the physical and chemical properties desired for the paper. It is also important for the impregnated paper not to be sticky and to be non-blocking.

SUMMARY OF THE INVENTION

By utilizing the technique of this invention, a latex can by synthesized which has excellent characteristics for utilization in the impregnation of paper employed in making masking tape. This latex can be employed in the impregnation of paper, such as that used in making masking tape, without encountering foaming or coagulum formation during normal processing. Additionally, the paper ultimately produced exhibits excellent water resistance, heat resistance, tear resistance, and delamination resistance. In fact, the latices of this invention compare favorably to carboxylated styrene-butadiene rubber latices which are currently being used commercially in the impregnation of paper that is used in making masking tape.

This invention more specifically discloses a process for preparing a latex which is particularly beneficial for utilization in manufacturing high performance masking tape, which comprises the sequential steps of (1) terpolymerizing a vinyl aromatic monomer, an alkyl acrylate, and an alkyl propenoic acid monomer in an aqueous polymerization medium by free radical polymerization in a first polymerization step to produce a seed polymer latex; (2) neutralizing the seed polymer latex to a pH of about 6 to about 9 by the addition of an alkali to produce a neutralized seed polymer latex; (3) adding additional vinyl aromatic monomer and additional alkyl acrylate monomer to the neutralized seed polymer latex; and (4) allowing the additional vinyl aromatic monomer and the additional alkyl acrylate monomer to polymerize in a second polymerization step to a solids content of about 30% to about 50% to produce the latex which is particularly beneficial for utilization in manufacturing high performance masking tape; wherein about 30 percent to about 50 percent of the total amount of vinyl aromatic monomer polymerized is polymerized in the first polymerization step; wherein about 30 percent to about 50 percent of the total amount of alkyl acrylate polymerized is polymerized in the first polymerization step; wherein at least about 90 percent of the total amount of the alkyl propenoic acid monomer polymerized is polymerized in the first polymerization step; and wherein a total of from about 25 phm to about 39 phm of vinyl aromatic monomer, from about 60 phm to about 70 phm of alkyl acrylate monomer, and from about 1 phm to about 5 phm of the alkyl propenoic acid monomer is polymerized in the first polymerization step and the second polymerization step.

DETAILED DESCRIPTION OF THE INVENTION

The latices which are synthesized in accordance with this invention are prepared utilizing free radical emulsion polymerization techniques. The first step of the process of this invention is carried out by adding a vinyl aromatic monomer, an alkyl acrylate monomer, and an alkyl propenoic acid monomer to water to form an aqueous polymerization medium. The aqueous polymerization medium will also normally contain a small amount of a surfactant. Terpolymerization of the three monomers is then initiated with a free radical generator. The latex made in this polymerization step is subsequently employed as a seed polymer latex in subsequent polymerization.

Generally, any vinyl aromatic monomer which is known to polymerize in free radical systems can be used. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, and the like. Styrene is generally the most preferred vinyl aromatic monomer.

The alkyl acrylate monomers that can be used generally have the structural formula:

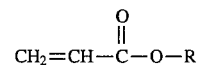

wherein R represents an alkyl group containing from 1 to 10 carbon atoms. The alkyl group in such alkyl acrylate monomers will preferably contain from 2 to 8 carbon atoms with alkyl groups which contain 4 carbon atoms being most preferred. Accordingly, ethyl acrylate, propyl acrylate, butyl acrylate, pentyl acrylate, hexyl acrylate, and 2-ethyl hexyl acrylate are preferred alkyl acrylate monomers with butyl acrylate being the most preferred. The alkyl groups in such alkyl acrylate monomers can be straight chained or branched. Thus, normal-propyl acrylate, isopropyl acrylate, normal-butyl acrylate, or tertiary-butyl acrylate can be employed. Normal-butyl acrylate is a particularly preferred monomer.

The alkyl propenoic acid monomers that can be used have the structural formula:

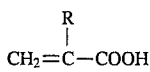

wherein R represents an alkyl group containing from 1 to 4 carbon atoms. The alkyl group (R) can accordingly be represented by the formula —$C_nH_{2n+1}$ wherein n is an integer from 1 to 4. Some representative examples of alkyl propenoic acid monomers which can be used include: methacrylic acid (2-methylpropenoic acid), 2-ethylpropenoic acid, 2-propylpropenoic acid, and 2-butylpropenoic acid. It is normally preferred to employ methacrylic acid as the alkyl propenoic acid monomer.

Essentially any type of free radical generator can be used to initiate such free radical emulsion polymerizations. For example, free radical generating chemical compounds, ultra-violet light or radiation can be used. In order to ensure a satisfactory polymerization rate, uniformity, and a controllable polymerization, free radical generating chemical agents which are water soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2,4-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the desired molecular weight of the terpolymer being synthesized. Higher molecular weights are achieved by utilizing smaller quantities of the initiator and lower molecular weights are attained by employing larger quantities of the initiator. However, as a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

A wide variety of types of emulsifiers or surfactants can be utilized in the process of this invention. For instance, rosin acid or fatty acid emulsifiers can be utilized. However, synthetic surfactants are normally preferred. Salts of alkyl sulfates, alkyl sulfonates and alkyl phosphates are particularly preferred for utilization as emulsifiers. The alkyl groups in these compounds generally contain from 1 to 30 carbon atoms. Normally the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate, and sodium dodecyl sulfate are some representative examples of highly suitable emulsifiers.

Generally from about 0.005 phm to about 0.5 phm of emulsifier is utilized in preparing the aqueous polymerization medium. In most cases, it will be preferred to utilize from about 0.01 phm to 0.1 phm of emulsifier. It is normally more preferred to utilize from about 0.04 phm to about 0.08 phm of the emulsifier. The precise amount of emulsifier required in order to attain optimal results will, of course, vary with the specific emulsifier being used. However, persons skilled in the art will be able to easily ascertain the specific amount of emulsifier required in order to attain optimal results.

The free radical emulsion polymerization will typically be conducted at a temperature which is within the range of about 30° C. to about 95° C. It is generally preferred for the polymerization to be carried out at a temperature which is within the range of 50° C. to about 90° C. It is typically more preferred to utilize a polymerization temperature which is within the range of about 60° C. to about 75° C. To increase conversion levels, it can be advantageous to increase the temperature as the polymerization proceeds. For instance, the polymerization temperature could be maintained at about 50° C. at the beginning of the polymerization (during the first polymerization step) and increased to a final temperature of about 75° C. at the end of the polymerization (during the final polymerization step).

As the polymerization proceeds in the first step of the process of this invention the pH of the polymerization medium stabilizes at a level of about 4. As the polymerization proceeds the solids content of the latex being synthesized also increases. In the first polymerization step the solids content of the latex being synthesized will typically increase to a level of about 10 percent to about 30%. It is not typically desirable to try to attain solids contents in excess of about 30 percent in the first polymerization stage because stability problems are generally occur at higher solids contents. In fact, stability problems are sometimes encountered at solids contents which are within the range of about 20 percent to about 25 percent. On the other hand, it is generally desirable to attain the highest solids content which is possible without encountering stability problems. For this reason, the solids content of the latex made in the first polymerization step will normally be within the range of about 15 percent to about 25 percent. It is typically preferred for the latex synthesized in the first polymerization step of have a solids content which is within the range of about 17 percent to about 20 percent.

After completing the first polymerization step the seed polymer latex made is neutralized by the addition of an alkali to a pH which is within the range of about 6 to about 9. The latex is preferably neutralized to a pH which is within the range of about 7 to about 9. The alkali will typically be added to the latex as an aqueous solution. For instance, an aqueous solution of ammonia can be added to the seed polymer latex to adjust its pH. This neutralization step will typically be carried out over a period of about 15 minutes to about 8 hours. The neutralization step will more typically be carried out over a period of about 30 minutes to about 3 hours and will preferably be carried out over a period of 45 minutes to 90 minutes.

After the seed polymer latex has been neutralized additional vinyl aromatic monomer and additional alkyl acrylate are added to the neutralized seed polymer latex. During this step the vinyl aromatic monomer and alkyl acrylate monomer are added to the polymerization medium over a period of about 15 minutes to about 6 hours. It is preferred for the period of monomer addition to be within the range of about 30 minutes to about 4 hours. It is preferred for the monomers to be added to the polymerization medium over a period of 1.5 hours to 3 hours.

After the addition of the additional monomers to the polymerization medium has begun the polymerization will continues as a second polymerization step The second polymerization step is allowed to continue until a very high conversion of monomers to polymer is attained. Typically the conversion reached will be in excess of about 95 percent. More typically monomer conversions in excess of about 98 percent will be attained with it being preferred for an essentially quantitative conversion in excess of 99 percent to be realized.

The solids content which is reached in the second polymerization step will normally be within the range of about 30 percent to about 50 percent is reached. More typically the solids content reached will be within the range of about 35 percent to about 45 percent. It is generally most preferred for the final solids content to be within the range of about 38 percent to about 42 percent.

In producing the latices of this invention it is critical for the vinyl aromatic monomer, the alkyl acrylate monomer, and the alkyl propenoic acid monomer to be split in a precise manner between the first polymerization step and the second polymerization step. Generally all of the alkyl propenoic acid monomer will be added in the first polymerization step. In any case, at least about 90 percent of the total amount of the alkyl propenoic acid polymerized in the first polymerization step and the second polymerization step is polymerized in the first polymerization step. It is normally preferred for at least about 95 percent of the total amount of the alkyl propenoic acid polymerized to be polymerized in the first polymerization step with it being more preferred for at least about 99 percent of the total amount of the alkyl propenoic acid monomer polymerized to be polymerized in the first polymerization step. As a matter of convenience all (100%) of the alkyl propenoic acid monomer polymerized can be polymerized in the first polymerization step.

It is also critical for about 30 percent to about 50 percent of the total amount of vinyl aromatic monomer polymerized in the first polymerization step and the second polymerization step to be polymerized in the first polymerization step. Preferably from about 30 percent to about 47 percent of the total amount of vinyl aromatic monomer polymerized will be polymerized in the first polymerization step. More preferably from about 30 percent to about 40 percent of the total amount of vinyl aromatic monomer polymerized will be polymerized in the first polymerization step.

It is further critical for about 30 percent to about 50 percent of the total amount of alkyl acrylate monomer polymerized in the first polymerization step and the second polymerization step to be polymerized in the first polymerization step. Preferably from about 30 percent to about 47 percent of the total amount of alkyl acrylate polymerized will be polymerized in the first polymerization step. More preferably from about 30 percent to about 40 percent of the total amount of the alkyl acrylate monomer polymerized will be polymerized in the first polymerization step.

The monomer ratios utilized in making the latex of this invention are important. For example, it is important for a total of about 25 phm to about 39 phm of the vinyl aromatic monomer to be polymerized in the first polymerization step and the second polymerization step. It is typically preferred for a total of about 29 phm to about 35 phm of the vinyl aromatic monomer to be polymerized in the first polymerization step and the second polymerization step. It is important for a total of about 60 phm to about 70 phm of the alkyl acrylate to be polymerized in the first polymerization step and the second polymerization step. It is typically preferred for a total of about 63 phm to about 67 phm of the alkyl acrylate monomer to be polymerized in the first polymerization step and the second polymerization step. It is also important for a total of about 1 phm to about 5 phm of the alkyl propenoic acid monomer to be polymerized in the first polymerization step and the second polymerization step. It is typically preferred for a total of about 2 phm to about 4 phm of the alkyl propenoic acid to be polymerized in the first polymerization step and the second polymerization step.

It had been determined that it is important for the polymer in the latex of this invention to have a glass transition temperature (Tg) which is within the range of about −10° C. to about +10° C. This is because if the polymer has a glass transition temperature which is less than about −10° C. it becomes to sticky for use in the impregnation of paper used in making masking tape. On the other hand, if it has a glass transition temperature which is higher than about +10° C., it will not bind properly by itself to the paper and also becomes too stiff. Preferably the resin will have a glass transition temperature which is within the range of about −5° C. to about +5° C.

After the latex is synthesized by employing the techniques of this invention it can be used in the impregnation of paper utilized in manufacturing masking tape. The latex can be employed in the impregnation of paper utilizing standard procedures which are well known to persons skilled in the art. One such procedure simply involves passing the paper through a bath containing the latex for residence time which is sufficient for the paper to absorb the latex.

The paper which in impregnated with the latex is then generally dried for subsequent processing. This procedure impregnates the paper with the resin from the latex which acts as a binder polymer in the paper. The binder polymer reinforces the paper in a manner which binds the individual fibers in the paper together without excessive filling of the void space in the paper. The physical and chemical properties of the binder polymer impregnated paper are accordingly greatly enhanced. More specifically, the impregnated paper exhibits high performance characteristics, such as excellent water resistance, heat resistance, tear resistance, and delamination resistance.

The binder polymer reinforced paper is then further manufactured into masking tape. This procedure involves coating one side of the paper with a release coat. The other side of the paper is coated with an adhesive layer. It is generally preferred for the side of the paper which is coated with the adhesive to be first coated with a primer coat and subsequently coated with the adhesive layer. The masking tape is then normally rolled and packaged.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES 1–10

In this series of experiments, 10 different latex samples were synthesized in a 5 liter reactor utilizing the techniques of this invention. In the procedure employed 125 phm of water, 10 phm of styrene, 19 phm of n-butyl acrylate, 3.75 phm of an 80% solution of methacrylic acid in water, and the amount of sodium dodecylsulfate specified in Table I (as a 28% aqueous solution) were initially charged into the reactor. The polymerization medium in the reactor was then heated to at a temperature of 70° C. and stirred by axial flow turbine agitation at a speed of 250 rpm. After the polymerization medium in the reactor reached the desired temperature of 70° C. polymerization was initiated by the addition of 5 phm of a 5% aqueous solution of potassium persulfate. The polymerization medium was maintained at a temperature of about 70° C. for the duration of the polymerization which took about 1.5 hours. During the first stage polymerization the solids content of the latex made in each of the experiments reached about 19.8%.

The latex was then neutralized by charging about 8 phm of a 10% aqueous ammonia solution into the reactor. The duration of the neutralization step employed in each of the 10 experiments is shown in Table I.

After the latex was neutralized 24 phm of additional styrene monomer and 44 phm of additional n-butyl acrylate monomer was charged into the polymerization medium. The styrene and n-butyl acrylate were charged into the polymerization medium over a period of the duration shown in Table I. During this second polymerization stage the polymerization medium was continued to be maintained at a temperature of about 70° C.

TABLE I

| Example | Soap Level | Neutralization | Second Stage |
| --- | --- | --- | --- |
| 1 | 0.25 phm | 1.0 hour | 2.5 hours |
| 2 | 0.25 phm | 1.0 hour | 2.5 hours |
| 3 | 0.18 phm | 2.5 hours | 1.5 hours |
| 4 | 0.18 phm | 2.5 hours | 1.5 hours |
| 5 | 0.25 phm | 0.5 hour | 1.0 hour |
| 6 | 0.25 phm | 0.5 hour | 1.5 hours |
| 7 | 0.25 phm | 0.5 hour | 0.5 hour |
| 8 | 0.25 phm | 2.5 hours | 1.5 hours |
| 9 | 0.18 phm | 0.5 hour | 1.5 hours |
| 10 | 0.18 phm | 2.5 hours | 0.2 hours |

As can be seen by reviewing Table I, Examples 1 and 2 were duplicate experiments. Examples 3 and 4 were also duplicate experiments.

The latex made in Example 9 destabilized during the second stage of the polymerization due to a combination of the low level of soap and short duration of the neutralization. In Example 10 a faster addition of monomers (0.2 hours) in the second stage polymerization lead to coagulation in the reactor and to a mechanically unstable latex.

The solids content, particle size, Brookfield viscosity, surface tension, and pH of the latices synthesized in Examples 1–8 are shown in Table II. The latices made in Examples 1, 2, 3, 4, and 6 exhibited excellent filterability on 100 mesh screens. The latices made in Examples 5 and 8 exhibited good filterability with the latex made in Example 7 not showing good filterability.

TABLE II

| Ex. No. | Solids Cont. (%) | Particle Size[1] (nm) | Brookfield Viscosity (mPa) | Surface Tension (mN/m) | pH |
| --- | --- | --- | --- | --- | --- |
| 1 | 42.1 | 127 | 85.7 | 52 | 7.97 |
| 2 | 41.0 | 120 | 160 | 54 | 8.50 |
| 3 | 42.4 | 164 | 123 | 43 | 9.04 |
| 4 | 40.7 | 145 | 33.0 | 51 | 7.97 |
| 5 | 39.5 | 135 | 57.1 | 37 | 9.45 |
| 6 | 39.5 | 136 | 44.2 | 37 | 9.17 |
| 7 | 40.5 | 135 | 15.3 | 45 | 9.60 |
| 8 | 41.8 | 138 | 75.3 | 51 | 7.84 |

[1]Particle size was determined by light scattering.

The mechanical stability of the latices made in Examples 1–8 was also determined. Each latex thickened during the mechanical stability test. The stable latex could be redispersed by addition of deionized water and the coagulum was measured. The unstable latex could not be redispersed. The latex made in Example 7 was unstable. In Examples 1, 3, 6, and 8 the latices made proved to have a mechanical stability of 0.000 g of coagulum per 100 g of latex. The latices made in Examples 2, 4, and 5 were determined to have mechanical stabilities of 0.004 g, 0.024g, and 0.050 g per 100 g of latex, respectively.

The latices made in Examples 1–3 were used to impregnate paper and the properties of the impregnated paper was compared to a control paper which was impregnated with an acrylic latex currently being used commercially to impregnate paper employed in manufacturing masking tape. The pick-up, dry tensile strength, dry elongation, wet tensile strength, wet elongation, aged tensile strength, aged elongation, and retention characteristics are reported in Table III. Retention is reported as a percentage which is calculated by dividing wet tensile strength by dry tensile strength.

TABLE III

| Latex | None | Ex. 1 | Ex. 2 | Ex. 3 | Control |
| --- | --- | --- | --- | --- | --- |
| Pick-up[1] | 0% | 57% | 55% | 60% | 71% |
| Dry Tensile[2] | 41.1 | 59.3 | 57.4 | 59.0 | 53.7 |
| Dry Elong. | 12.6% | 12.8% | 13.2% | 15.9% | 16.7% |
| Wet Tensile[2] | 11.0 | 38.1 | 40.1 | 33.7 | 19.6 |
| Wet Elong. | 9.0% | 17.6% | 19.1% | 18.1% | 14.7% |
| Aged Tensile[2] | 41.3 | 42.5 | 43.7 | 50.3 | 46.4% |
| Aged Elong. | 11.8% | 8.3% | 8.9% | 12.7% | 14.6% |
| Retent. | 25% | 64.2% | 70.2% | 57.1% | 36.5% |

[1]Pick-up is reported as the ratio of the dry latex weight to the raw paper weight.
[2]The tensile strengths reported are in Newtons per 15 mm of paper.

The wet tensile strengths reported in Table III were determined after soaking the impregnated paper for 1 hour in deionized water. The aged tensile strengths reported were determined after aging the impregnated paper for 1 hour at a temperature of 160° C.

As can be seen from Table III, the paper which was impregnated with the latices of this invention exhibited higher wet and dry tensile strengths than the paper which was impregnated with control latex even though the control latex had a greater pick-up. The paper which was impregnated with the latices of this invention had a very greatly improved wet tensile strength. It also displayed improved wet elongation characteristics. For these reasons, masking tape which is highly water resistant can be manufactured utilizing the latices of this invention.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a latex which is particularly beneficial for utilization in manufacturing high performance masking tape, which comprises the sequential steps of (1) terpolymerizing a monomer mixture which consists essentially of a vinyl aromatic monomer, an alkyl acrylate, and an alkyl propenoic acid monomer in an aqueous polymerization medium by free radical polymerization in a first polymerization step to produce a seed polymer latex; (2) neutralizing the seed polymer latex to a pH of about 6 to about 9 by the addition of an alkali to produce a neutralized seed polymer latex; (3) adding additional vinyl aromatic monomer and additional alkyl acrylate monomer to the neutralized seed polymer latex; and (4) allowing the additional vinyl aromatic monomer and the additional alkyl acrylate monomer to polymerize in a second polymerization step to a solids content of about 30% to about 50% to produce the latex which is particularly beneficial for utilization in manufacturing high performance masking tape; wherein about 30 percent to about 50 percent of the total amount of vinyl aromatic monomer polymerized is polymerized in the first polymerization step; wherein about 30 percent to about 50 percent of the total amount of alkyl acrylate polymerized is polymerized in the first polymerization step; wherein at least about 90 percent of the total amount of the alkyl propenoic acid monomer polymerized is polymerized in the first polymerization step; and wherein a total of from about 25 phm to about 39 phm of vinyl aromatic monomer, from about 60 phm to about 70 phm of alkyl acrylate monomer, and from about 1 phm to about 5 phm of alkyl propenoic acid monomer is polymerized in the first polymerization step and the second polymerization step.

2. A process as specified in claim 1 wherein the vinyl aromatic monomer is styrene.

3. A process as specified in claim 2 wherein the alkyl acrylate monomer is n-butyl acrylate.

4. A process as specified in claim 3 wherein the alkyl propenoic acid monomer is methacrylic acid.

5. A process as specified in claim 4 wherein about 30 percent to about 47 percent of the total amount of styrene polymerized is polymerized in the first polymerization step; wherein about 30 percent to about 47 percent of the total amount of n-butyl acrylate polymerized is polymerized in the first polymerization step; and wherein at least about 95 percent of the total amount of methacrylic acid polymerized is polymerized in the first polymerization step.

6. A process as specified in claim 5 wherein said process is conducted at a temperature which is within the range of about 30° C. to about 95° C.

7. A process as specified in claim 6 wherein the latex made in the first polymerization step has a solids content which is within the range of about 10% to about 30%.

8. A process as specified in claim 7 wherein the neutralization is carried out over a period of about 15 minutes to about 8 hours.

9. A process as specified in claim 8 wherein the additional styrene and additional n-butyl acrylate are added to the neutralized seed polymer latex in step (3) over a period of about 15 minutes to about 6 hours.

10. A process as specified in claim 9 wherein a total of about 29 phm to about 35 phm of styrene is polymerized in the first polymerization step and the second polymerization step; wherein a total of about 63 phm to about 67 phm of n-butyl acrylate is polymerized in the first polymerization step and the second polymerization step; and wherein a total of about 2 phm to about 4 phm of methacrylic acid is polymerized in the first polymerization step and the second polymerization step.

11. A process as specified in claim 10 wherein the neutralization is carried out over a period of about 30 minutes to about 3 hours.

12. A process as specified in claim 11 wherein the additional styrene and additional n-butyl acrylate are added to the neutralized seed polymer latex in step (3) over a period of about 30 minutes to about 4 hours.

13. A process as specified in claim 12 wherein the seed polymer latex is neutralized in step (2) to a pH which is within the range of about 7 to about 9.

14. A process as specified in claim 13 wherein about 30 percent to about 45 percent of the total amount of styrene polymerized is polymerized in the first polymerization step; wherein about 30 percent to about 45 percent of the total amount of n-butyl acrylate polymerized is polymerized in the first polymerization step; and wherein at least about 99 percent of the total amount of methacrylic acid polymerized is polymerized in the first polymerization step.

15. A process as specified in claim 14 wherein virtually 100% of the methacrylic acid polymerized is polymerized in the first polymerization step.

16. A process as specified in claim 15 wherein the latex made in the first polymerization step has a solids content which is within the range of about 15% to about 25%.

17. A process as specified in claim 16 wherein the solids content which is reached in the second polymerization step is within the range of about 35 percent to 45 percent.

18. A process as specified in claim 17 wherein the neutralization is carried out over a period of about 45 minutes to about 1.5 hours.

19. A process as specified in claim 18 wherein the additional styrene and additional n-butyl acrylate are added to the neutralized seed polymer latex in step (3) over a period of about 90 minutes to about 3 hours.

20. A process as specified in claim 19 wherein said process is conducted at a temperature which is within the range of about 50° C. to about 90° C.

21. A process as specified in claim 20 wherein the alkali is ammonia.

* * * * *